K. HOFFMAN.
WRENCH FOR SHUT-OFF VALVES OR THE LIKE.
APPLICATION FILED FEB. 23, 1921.
1,420,701.
Patented June 27, 1922.
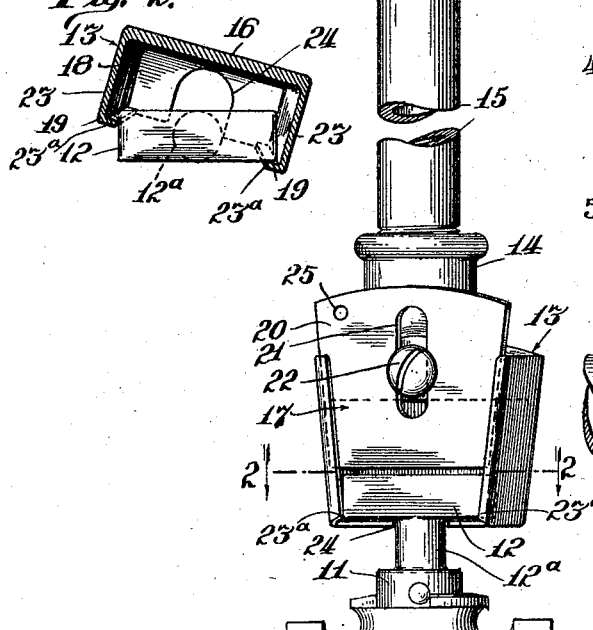
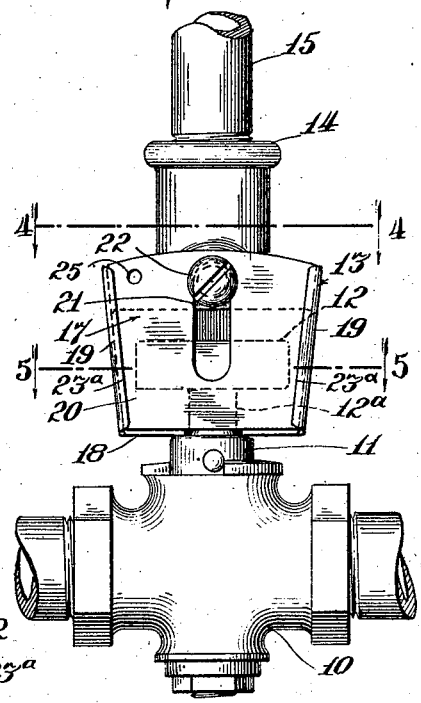
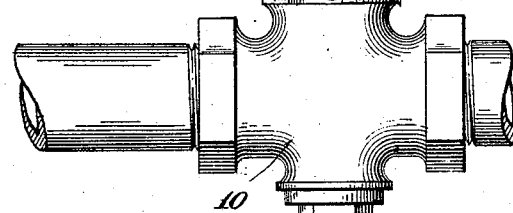
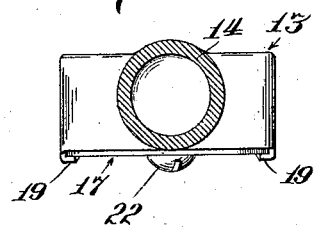
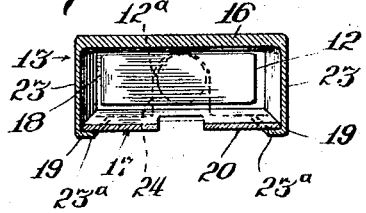

UNITED STATES PATENT OFFICE.

KEVA HOFFMAN, OF CHICAGO, ILLINOIS.

WRENCH FOR SHUT-OFF VALVES OR THE LIKE.

1,420,701.  Specification of Letters Patent.  Patented June 27, 1922.

Application filed February 23, 1921. Serial No. 447,098.

*To all whom it may concern:*

Be it known that I, KEVA HOFFMAN, a citizen of the United States, residing at Chicago, in the county of Cook and State of Illinois, have invented certain new and useful Improvements in Wrenches for Shut-Off Valves or the like, of which the following is a specification.

My invention relates to a wrench for a shut-off valve, or the like, particularly to that type of valve which is commonly employed in connection with service pipes running underground and the invention will be described in connection with such type of valve although it is to be understood that I do not thereby intend to limit my invention because I apprehend it may have utility in connection with other valves or shut-off means.

It is common practice to provide service pipes leading from the water mains in the street to residences and other buildings which pipes are placed at a depth of several feet to avoid freezing and it is customary to provide a shut-off valve in each service pipe so that the water to each individual building may be shut off whenever desired. These shut-off valves can only be operated by means of a suitable wrench on the end of a relatively long rod the usual practice being to provide a box or conduit of relatively small cross-sectional area extending from the valve to the surface of the ground and through which the operating wrench may be inserted. These conduits in a short time fill up with sand and dirt and very often the shut-off valves are buried thereunder so that it is impossible to place the socket into effective engagement with the cross arm of the stem of the shut-off valve, consequently, the common practice heretofore has been to place the socket in operative position with the cross arm and then secure it thereto by means of a short piece of wire. The conduit box contains considerable moisture, sometimes there being considerable water in them, so that the wire in a relatively short time rusts to such an extent that it breaks under slight pressure or tension and the socket slips off the cross arm. In ordinary installations it is not possible to secure the socket again in holding engagement with the valve stem by inserting a new length of wire because of the depth of the valve underground and the small working space in the conduit, consequently, it is necessary to dig down and uncover the valve in order to secure the old wrench or a new one in holding engagement with the valve stem.

The primary object of my invention is to provide an improved wrench which is so constructed that it will automatically associate itself operatively with the cross arm of the valve stem by a slight turning movement of the wrench when it is lowered onto the top of the cross arm, even though the valve is a considerable distance underground, difficult to get at and out of view of the person manipulating the wrench.

Some attempts have been made to provide a device of this sort but the devices of the prior art do not operate automatically and, furthermore, they have been unsatisfactory because the construction has been such that they easily slip off the cross arm of the valve stem and, therefore, are no better than the ordinary socket wrenches commonly employed. My invention contemplates a wrench having a U-shaped socket formed by providing a back member adapted to bear against one side of the cross arm of the valve stem and means at the front side adapted to bear against the other side of the cross arm when the socket is in operative position on the valve and a further object of my invention is to provide bridging means at the bottom and at each end extending from said back member to said means at the front side, the space between said bridging means being sufficient to receive said cross arm, when it is presented endwise thereto, and the neck of the valve stem, the means at the front side comprising supporting members at each corner, and means, preferably, a plate slidably associated with said supporting members and having limited vertical movement relative thereto whereby said plate automatically adjusts itself to bear against the adjacent side of the cross arm when the wrench is brought into operative position on the valve and locks the wrench to the cross arm. The bridging means mentioned eliminate entirely all possibility of the wrench slipping off the valve.

The invention consists in the novel constructions and arrangements to be hereinafter described and claimed for carrying out the above stated objects and such other incidental objects as will appear from the following description of a certain preferred embodiment of the invention illustrated in the accompanying drawings, wherein—

Fig. 1 is a side elevational view of a wrench embodying the principles of my invention with the parts in the position they assume just before the wrench operatively engages the cross arm of the valve stem.

Fig. 2 is a sectional view taken on the line 2—2 of Fig. 1.

Fig. 3 is a side elevational view of the wrench in operative engagement with the cross arm of the valve stem, and Figs. 4 and 5 are sectional views taken, respectively, on the lines 4—4 and 5—5 of Fig. 3.

Like characters of reference designate like parts in the several views.

Referring to the drawings it will be seen that the wrench embodying my invention is shown in connection with a shut-off valve 10 provided with a valve stem 11 which is manipulated by means of a cross arm 12 rigidly connected thereto. The wrench comprises a socket designated generally by the reference character 13 which is provided with a boss 14 internally threaded for the reception of a screw threaded operating rod 15.

The socket of the wrench is U-shaped and formed by providing a back member 16 adapted to bear against one side of the cross arm of the valve stem and means at the front side, designated generally by the reference character 17, adapted to bear against the other side of the cross arm when the socket is in operative position on the valve. Bridging means 18 is provided at the bottom and at each end extending from the back member 16 to said means 17 the space between said bridging means being sufficient to receive the cross arm, when it is presented endwise thereto, and the neck 12$^a$ of the valve stem. The means at the front side comprises a supporting member 19 at each corner and means, preferably a plate 20 slidably associated with said supporting members, which operates automatically and is adapted to bear against the adjacent side of the cross arm when the wrench is turned. Vertical movement of the plate relative to its supporting members is limited, the plate preferably having a slot 21 into which projects a pin or set screw 22 secured to the head of the socket.

Preferably the socket is formed of a casting, the ends thereof being closed by the members 23, flanges 23$^a$ being formed thereon so as to provide for sliding movement of the plate 20, the bridging means 18 being a web formed integrally with the back member 16 and end members 23, a transverse slot 24 extending from the front side thereof back towards the back member.

Operation: The wrench is inserted in the conduit, in the bottom of which the shut-off valve is placed, and positioned so that the longitudinal axis is substantially at a right angle to the longitudinal axis of the cross arm 12 and is turned sufficiently to bring the slot 24 into alignment with one end of the cross arm. The socket may then drop or be pushed down, the cross arm pushing upwardly the plate 20 until it reaches its limit of upward movement or is pushed upwardly sufficiently to permit the cross arm to swing into the socket between the bottom of the plate and the bridging means. The wrench may then be turned in either direction, it makes no difference which, so that one end of the cross arm will project into the socket substantially as shown in Fig. 2. Further movement of the socket in the same direction will result in the neck 12$^a$ of the valve stem entering the slot 24 so that the wrench may be turned sufficiently to bring the longitudinal axis of the socket into substantial alignment with that of the cross arm as shown in Fig. 5, thereupon the plate 20 drops by gravity into the position shown in Fig. 3 and the wrench is securely locked on the valve stem. Any turning movement of the wrench will result in the back wall 16 and the plate 20 bearing against the respective adjacent sides of the cross arm so that the cross arm is turned with the wrench. The bridging means 17 engage the under surfaces on both sides of the cross arm and upward movement of the wrench is limited so that there is no possibility of the wrench losing its grip due to tilting or turning movement of the wrench. A device constructed according to my invention effectively maintains its hold upon the cross arm of the valve stem under all conditions.

The plate 20 may be provided with a small aperture 25 for the insertion of a wire or small rod (not shown) so that the plate may be pulled upwardly relative to the socket if for any reason it is desired to release the socket from the valve stem.

I claim:

1. A wrench for shut-off valves, or the like, having a U-shaped socket formed by providing a back member adapted to bear against one side of the cross arm of the valve stem and means at the front side adapted to bear against the other side of said cross arm when the socket is in operative position on the valve, bridging means at the bottom and at each end extending from said back member to said means at the front side, the space between said bridging means being sufficient to receive said cross arm, when it is presented endwise thereto, and the neck of the valve stem, said means at the front side comprising supporting members at each front corner, and means associated with said supporting members adapted to bear against the adjacent side of said cross arm.

2. A wrench for shut-off valves, or the like, having a U-shaped socket formed by providing a back member adapted to bear against one side of the cross arm of the valve stem and means at the front side adapted to bear against the other side of said cross arm when the socket is in operative position on the valve, bridging means at the bottom and at each end extending from said back member to said means at the front side, the space between said bridging means being sufficient to receive said cross arm, when it is presented endwise thereto, and the neck of the valve stem, said means at the front side comprising supporting members at each front corner, and means associated with said supporting members which automatically adjusts itself to bear against the adjacent side of said cross arm when the socket is in operative position on the valve.

3. A wrench for shut-off valves, or the like, having a U-shaped socket formed by providing a back member adapted to bear against one side of the cross arm of the valve stem and means at the front side adapted to bear against the other side of said cross arm when the socket is in operative position on the valve, bridging means at the bottom and at each end extending from said back member to said means at the front side, the space between said bridging means being sufficient to receive said cross arm, when it is presented endwise thereto, and the neck of the valve stem, said means at the front side comprising supporting members at each front corner, and a plate slidably associated with said supporting members which automatically adjusts itself to bear against the adjacent side of said cross arm, when the socket is in operative position on the valve.

4. A wrench for shut-off valves, or the like, having a U-shaped socket formed by providing a back member adapted to bear against one side of the cross arm of the valve stem and means at the front side adapted to bear against the other side of said cross arm when the socket is in operative position on the valve, bridging means at the bottom and at each end extending from said back member to said means at the front side, the space between said bridging means being sufficient to receive said cross arm, when it is presented endwise thereto, and the neck of the valve stem, said means at the front side comprising supporting members at each front corner, a plate slidably associated with said supporting members, and means adapted to limit vertical movement of said plate relative to said supporting members, whereby said plate automatically adjusts itself to bear against the adjacent side of said cross arm when the socket is in operative position on the valve.

5. A wrench for shut-off valves, or the like, having a socket which is closed at both ends and at one side but open at the other side, the bottom also being closed except for a medially located transverse slot extending from said open side backwardly toward the other side, said slot being of sufficient width to receive the cross arm of the valve stem, when it is presented endwise thereto, and the neck of the valve stem, and means adapted to close said open side whereupon said means and said other side bear against the respective sides of said cross arm when the socket is turned.

6. A wrench for shut-off valves, or the like, having a socket which is closed at both ends and at one side but open at the other side, the bottom also being closed except for a medially located transverse slot extending from said open side backwardly toward the other side, said slot being of sufficient width to receive the cross arm of the valve stem, when it is presented endwise thereto, and the neck of the valve stem, and means adapted to automatically adjust itself to bear against the adjacent side of said cross arm when the socket is in operative position on said valve.

7. A wrench for shut-off valves, or the like, having a socket which is closed at both ends and at one side but open at the other side, the bottom also being closed except for a medially located transverse slot extending from said open side backwardly toward the other side, said slot being of sufficient width to receive the cross arm of the valve stem, when it is presented endwise thereto, and the neck of the valve stem, and a plate slidably mounted on said socket which automatically adjusts itself to bear against the adjacent side of said cross arm when the socket is in operative position on said valve.

8. A wrench for shut-off valves, or the like, having a socket which is closed at both ends and at one side but open at the other side, the bottom also being closed except for a medially located transverse slot extending from said open side backwardly toward the other side, said slot being of sufficient width to receive the cross arm of the valve stem, when it is presented endwise thereto, and the neck of the valve stem, a plate slidably mounted on said socket, and means adapted to limit vertical movement of said plate relative to said socket, whereby said plate automatically adjusts itself to bear against the adjacent side of said cross arm when the socket is in operative position on the valve.

9. A wrench for shut-off valves, or the like, having a socket which is closed at both ends and at one side but open at the other side, the bottom also being closed except for a medially located transverse slot extending from said open side backwardly toward the other side, said slot being of sufficient width to receive the cross arm of the valve stem, when it is presented endwise thereto, and the neck of the valve stem, a plate slidably mounted on said socket, said plate having a vertical slot, and a pin mounted on said socket and projecting through said slot whereby vertical movement of said plate is limited and it is maintained under the influence of gravity and automatically adjusts itself to bear against the adjacent side of said cross arm when the socket is in operative position on the valve.

KEVA HOFFMAN.